Figure 1:
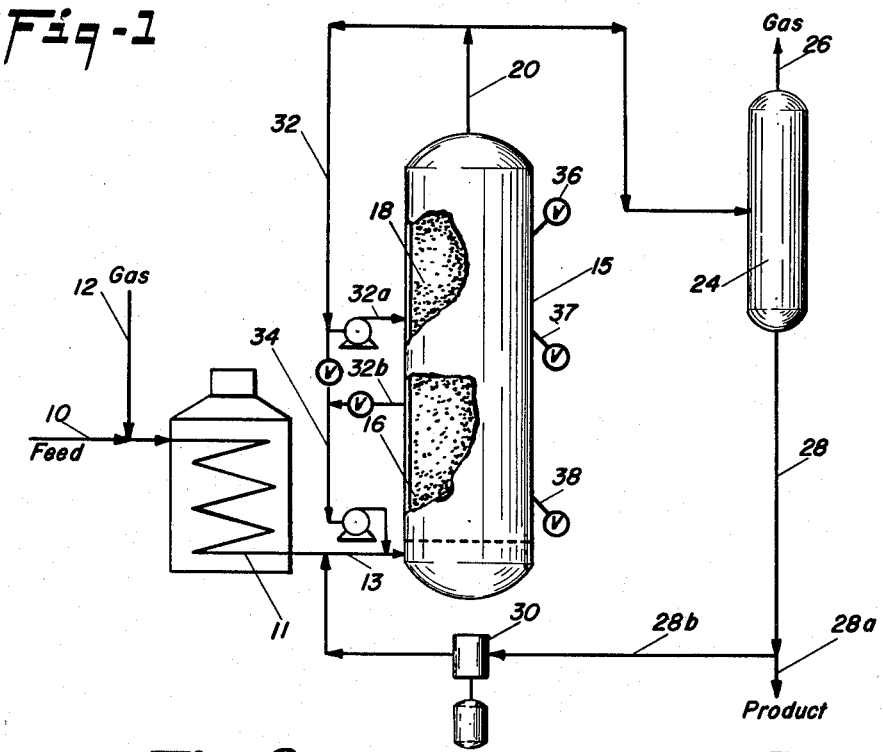

May 11, 1965  R. WOLK  3,183,178
TWO STAGE HYDROGENATING PROCESS EMPLOYING
TWO DIFFERENT PARTICLE SIZES
Filed June 6, 1961

INVENTOR.
RONALD WOLK
BY
Attorney 3,183,178
TWO STAGE HYDROGENATING PROCESS EMPLOYING TWO DIFFERENT PARTICLE SIZES
Ronald Wolk, Trenton, N.J., assignor to Hydrocarbon Research, Inc., New York, N.Y., a corporation of New Jersey
Filed June 6, 1961, Ser. No. 115,154
5 Claims. (Cl. 208—58)

This invention relates to a process for the contacting of liquids and gases in the presence of solids.

In the Johanson application for patent, Serial No. 743,-304, filed June 20, 1958, and now U.S. Patent No. 2,987,-465, a liquid and gas are passed upwardly through the bed of particulate solids under conditions to establish a random motion of the particles in the liquid without carrying the solids out of the reactor. Based on the particulate solid size and density and liquid density velocity and viscosity, the mass of particulate solids is expanded from about a 10% greater volume than the settled state of the mass to as much as three times the settled volume. This random motion of the particles in the liquid which is described by Johanson as "ebullation," has been found to be particularly beneficial in many physical and chemical processes including hydrogenation, desulfurization, hydrocracking, halogenation, oxidation of hydrocarbons, sulfonation, nitration, amidization, scrubbing, and absorption.

In the specific field of hydrogenation of certain heavy hydrocarbon oils, the Keiht-Laying application, Serial No. 737,711, filed May 26, 1958, and now U.S. Patent No. 2,987,467, teaches that if the oil in liquid phase and hydrogen are passed through a precracking zone wherein at least about 25% by volume of the stock which boils above 900° F. is converted to hydrocarbons boiling below 900° F., and the precracked material then hydrodesulfurized, materially superior results were obtained.

My invention takes into account the foregoing concepts and provides a further improvement which materially simplifies the reactor, facilitates adjustability of the reactions without taking the reactor off stream, permits simplified removal and restoration of the particulate solids and increases the yields of the desired products.

More specifically, my invention concerns the use of two different sizes of particulate solids, having the same density, of the same or different types, or two particulate solids of the same size, having different densities, of the same or different types, or two particles, of different size and density, of the same or different type, either or both of which may be catalytic wherein the size and density differences, and the conditions of ebullation within the teachings of this invention is critical and controlled to establish in fact a single contact zone of separate layers of particles, each of which is specifically adapted to its particular function.

My invention is based on ebullated bed techniques wherein the particles are normally maintained in the reaction zone. Furthermore, to accomplish a satisfactory multiple layer or strata of particulate solids, it is necessary to have each particulate solid within a close size or density tolerance.

My invention while generally adapted to liquid-solid-gas phase contacting in chemical reactions exemplified by hydrogenation, desulfurization, hydrocracking, halogenation, oxidation of hydrocarbons, sulfonation, nitration and amidization, is specifically adapted for the hydrogenation of residuum hydrocarbon oils to upgrade them for superior commercial purposes.

Further objects and advantages of my invention will appear from the following description of a preferred form of embodiment thereof, taken in connection with the attached drawing in which:

FIG. 1 is a diagrammatic view of a reactor and certain associated equipment used for ebullated bed contacting.

Figure 2:
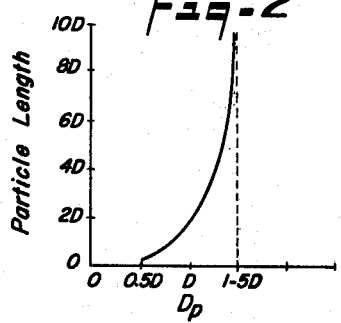
Figure 3:
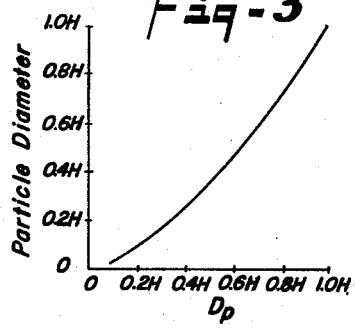
Figure 4:
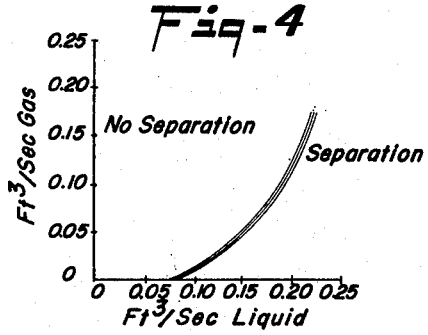

FIGS. 2, 3, and 4 are schematic curves illustrating characteristic data as hereinafter explained.

As one example of my invention I have shown in FIG. 1 a diagrammatic representation of a unitary apparatus for carrying out a two step liquid-gas-solids contacting process. In this case, which is for the hydrogenation of a heavy oil such as a Kuwait or Boscan residuum, the charge stock is supplied by line 10 to preheating coil 11. Both of these residuums have large amounts of organo-metallic compounds. Kuwait has about 80 p.p.m. of vanadium and Boscan residuum has about 1200 p.p.m. of vanadium. It is admixed with hydrogen containing gas introduced by way of line 12 and the heated oil and gas, under reaction conditions to initiate the exothermic hydrocracking reaction, is then introduced by line 13 into the reactor vessel 15. The reactor vessel 15 which is usually a high pressure chamber is filled with a composite mass of particulate solids 16 as hereinafter described.

From an operating standpoint, the gas, and oil in a continuous liquid phase, pass through the solids 16 at a velocity to accomplish random motion of the solids in the liquid as heretofore described as ebullation and under temperature and pressure conditions to accomplish a conversion of at least 25% of the hydrocarbon fraction boiling above 900° F. to a fraction boiling below 900° F. The solids contained in the lower zone should be of the type silica or alumina. The partially converted cracked oil then passes upwardly through the upper reaction section 18 for desulfurization.

The upper section 18 is also filled with particulate solids which in this instance are preferably catalytic such as a cobalt molybdate sulf-active hydrogenation catalyst. As the liquid from the lower section passes through such catalyst, it accomplishes a desulfurization and the product oil is then taken overhead through line 20. This oil is then passed to liquid knockout drum 24 with the hydrogen containing gas passed overhead at 26 and a liquid stream removed as bottoms at 28. Part of this liquid stream may be drawn off as product at 28a and the remainder recycled through the line 28b and pump 30 to the liquid feed line 13.

As heretofore described, ebullated conditions are desired in both the lower zone and the upper zone. It is found that with a liquid rate of at least 10 gallons per minute per square foot of horizontal cross section of reactor and with particles of about ⅜₁₆" in length by ⅟₁₆" in diameter, using oil of the above type at about 800° F., an expansion of at least 10% in the particulate solids over the settled state volume is possible.

Provision is made for recycle of oil from the upper part of the bed through line 32 and by means of line 34 to the bottom of the bed. Suitable valves may be provided with lines 32a and 32b so arranged as to permit recycle around each of the beds as desired.

In a reaction as above described, it is desirable to use different types of particulate solids as for example an alundum non-catalytic solid for the hydrocracking in the lower zone 16 and a catalyst such as cobalt molybdenum for the hydrodesulfurization in the upper zone 18. I find that I can maintain two or more such separate beds or zones without separating devices by the use of particles which differ in size, shape or density one from the other, by minimum and maximum factors as hereinafter described.

I first fill the reactor 15 through catalyst line 36 with 35% of the volume of the reactor of the larger solids and then with substantially 30% of the volume of the reactor with smaller solids. The order of filling is not critical for when the liquid rises through the mass the larger particles will expand and fill substantially 45% of the lower part of the reactor. As the same time, the smaller particles will move to an upper layer position and also fill about 45% of the reactor. The balance of 10% establishes a liquid-solids separation zone.

The separation and segregation of the solids is based on a difference of particle size or density which results in a difference in voidage expressed by the letter "E." I find that different sizes of solids will separate if the voidage E produced by fluidizing a bed of either solid separately differs from the other by a value of 0.05 or more. This value is good in the range of $E=0.45$ to $E=0.75$. Above $E=0.75$ the difference that will cause separation is lower.

These differences in the voidage are necessary because of the extremely turbulent motion of the particles once they are ebullated. This turbulence tends to cause backmixing of particles in the bed which is detrimental to separation. This is especially prevalent when the reactor length to diameter ratio is from in the range of 1 to 2 as is proposed for many processes including hydrogenation of heavy oil.

The effect of the gas is to produce an uneven liquid velocity profile which results in a loss of separation potential since some large particles are caught in high velocity jets which carry them toward the top and some small particles are caught in low velocity sector or in a backmixing sector which carry them toward the bottom. There is a critical relationship between the gas and liquid flow for which separation is possible.

However, in the interests of economical commercial design it is unlikely that conditions will ever be used to give an E greater than 0.75. The maximum difference is likely to be about 0.15. This value gives a $D_{p_1}/D_{p_2}$ of about 1.8 where $D_p$ is the effective particle diameter.

It is necessary to limit the difference in particle density and/or size so that at the desired operating condition the particles occupying the lower section are expanded at least about 10% and those occupying the upper section have a voidage of not more than 75%. If possible, it is desirable to select the particles so that there is a rather wide range of flow rates between the two limits.

By specifying the minimum difference in voidage E which is necessary for separation, a definite size difference may be calculated. A difference in E of 0.05 indicates a ratio of 1.35 of the effective particle diameters providing the gas rate does not exceed critical limits which cause backflow of particles.

For spheres of diameter D the actual diameter is equal to $D_p$. Then $D_1/D_2$ greater than 1.35 is needed for separation. For example, spheres of .06" and .04" will separate under ebullated bed technique.

For cylinders of equal diameters and different lengths FIG. 2 gives a plot of particle length in terms of diameter D vs. equivalent diameter $D_p$. For separation it is necessary to select the two values of length so that $D_{p_1}/D_{p_2}$ is greater than 1.35.

For example, assuming a particle having a length of 4D (i.e., 4 times as long as its diameter) the equivalent diameter $D_p$ from the curve FIG. 2 is 1.35D. Therefore, the length of the second particle, for separation, must satisfy the equation $D_{p_1}/D_{p_2}$ is greater than 1.35 or $$\frac{1.35}{X}=1.35$$

or $D_{p_2}$ equals 1.00D or less. This length from FIG. 2 is then 1.0D.

Another example:
If particle $a$ has a length of 2D $$\left(\text{i.e., } \frac{L}{\frac{1}{8}''} \times \frac{D}{\frac{1}{16}''}\right)$$

$$D_{p_1}=1.25D$$

and $$\frac{D_{p_1}}{D_{p_2}}=1.35$$

then $$\frac{1.25D}{D_{p_2}}=1.35$$

or $$D_{p_2}=\frac{1.25}{1.35}=0.9D \text{ is length of particle } b.$$

For cylinders of equal length and different diameters, FIG. 3 gives a plot of particle diameter vs. $D_p$ in term of particle length. It is necessary to select the two diameters so that $D_{p_1}/D_{p_2}$ is greater than 1.35 for separation. This may be in the same manner as indicated in the example.

Similar curves relating to differences in density to differences in voidage E are drawn in a similar manner. In addition, combinations of size and density differences could be utilized to produce the necessary differences in voidage E.

Because of the detrimental effect of the high gas flow rates which cause such turbulence and backmixing of solids as to prevent separation there is a critical relationship between gas and liquid flow rates. FIG. 4 shows a family of curves that separate the flow rates necessary for separation and non separation for two sizes of particles one being $\frac{1}{16}''$ in diameter and $\frac{3}{16}''$ in length and the other $\frac{1}{32}''$ in diameter and $\frac{3}{16}''$ in length. This data was obtained in a 6.0 inch inside diameter reactor. This curve for liquid flows greater than 0.04 ft./sec. fits the equation gas rate$=8.33$ (liquid rate)$^{2.50}$ $-.025$.

A similar curve for any set of particles can be determined experimentally. However, since this combination gives a value of $D_{p_1}/D_{p_2}$ so close to the minimum, any set of particles which exceeds this value of $D_{p_1}/D_{p_2}$ operation in the "separation zone" would be successful.

The operating conditions for hydrodesulfurization of heavy residuum is substantially the same as practiced without ebullated beds or without a common reaction zone. As a preferred example the reactor is preferably operated under relatively high pressure in the order of 3000 p.s.i.g. but pressures may vary from about 1000 to 5000 p.s.i.g. with different charge stocks.

Cracking conditions in the lower zone 16 will normally be made in the order of 825° F. with a controlled circulation to prevent the temperature from increasing much beyond 900° F. This in turn will control the temperature in the upper zone 18.

The following examples are based on laboratory investigations:

*Examples*

|  | 12° API Vacuum Bottoms | Kuwait Residuum | Boscan Crude |
| --- | --- | --- | --- |
| Charge Stock, API, degrees | 13.1 | 6.9 | 10.5 |
| Sulfur, percent | 1.37 | 5.39 | 5.54 |
| Ramsbottom Carbon, percent | 13.14 | 17.83 | 15.46 |
| Operating Conditions: |  |  |  |
| Temperature, °F | 800–825 | 800–850 | 775 |
| Pressure, p.s.i.g | 2,900 | 2,250 | 2,900 |
| Hydrogen, s.c.f./bbl | 6,000 | 6,000 | 6,000 |
| Space Velocity, bbl./lb./day | 0.23 | 0.19 | 0.34 |
| Recycle | 12.1 | 10.1 | 25.1 |
| Liquid Velocity, g.p.m./ft.$^2$ | 60 | 75 | 75 |
| Gas Velocity, ft./sec | 0.10 | 0.15 | 0.10 |
| Product: |  |  |  |
| IBP–400° F | 9.7% | 15.2% | 16.1 to 380° |
| 400–680° F | 19.4% | 28.4% | 26.1 to 600° |
| 680–975° F | 32.1% | 30.4% | 43.0 to 886° |
| 975 plus | 43.3% | 28.1% | 14.8 above |
| C$_4$–C$_6$ gas | 1.2% | 1.3% |  |
| Total Product: |  |  |  |
| API, degrees | 23.8 | 25.5 | 27.6 |
| Sulfur, percent | 0.18 | 0.50 | 1.08 |
| Carbon, percent | 4.19 | 5.1 | 6.25 |
| Conversion rates (diff. of 975 plus) | 56.7 | 71.9 |  |
| Desulfurization, percent | 87 | 91 | 80 |

These results from the use of $\frac{1}{16}''$ cobalt molybdate extruded catalyst 3/16" in length and 1/32" cobalt molybdate extruded catalyst 3/16" in length. These were used to fill 30% of the reactor with 1/32" material and 35% of the reactor with the 1/16" material. On expansion, each filled 45% of the reactor.

After processing Kuwait residuum with the previously mentioned systems for 30 days it was decided to change the stock to a Boscan crude which has 1200 p.p.m. of vanadium compound as compared to 80 p.p.m. in Kuwait. In order to protect the second stage catalyst from vanadium poisioning, an amount of inert material in the precracking lower zone was introduced to provide surface for vanadium removal reactions. By increasing the lower zone particle volume to 65% of the reactor volume and decreasing the upper zone catalyst volume to 25% of the reactor volume, this was accomplished. This change was carried out very rapidly without taking the unit off stream.

This results from the existence of a two layer but common bed of particulate solids in liquid so that a drawoff 37 can draw off principally the smaller particles while drawoff 38 can draw off principally larger particles. Any restoration can be quickly accomplished through inlet 36 for the particles will immediately reach their relative position as a result of the buoyant effect of the upflowing liquid.

Difference in particle size must not exceed those limits that the largest particle must be subject to fluidization at liquid flow rates that will not carry the smallest particle out of the reactor.

While I have heretofore discussed the minimum differential in size of the particles which will permit separation, it will be apparent that there is also a maximum differential in size which must not be exceeded.

For example, the use of 10–12 and 60–72 mesh granules would result in the smaller material being carried out of the bed when the liquid velocity was high enough to ebullate the larger solids. The use of 10–12 and 35–40 mesh granules would also be undesirable since density of the smaller catalyst in the upper zone would be extremely low when the liquid velocity was high enough to ebullate the larger solids.

However, the maximum size differential may be effective on the larger particles also. When the particles are so large as to be non-fluidizable by the liquid flow available, ebullation can not exist.

Basically my invention thus resides in selecting as the major size element a particle which will be fluidized by the flow which is appropriate for the reaction. Thereafter, a smaller particle size that will be small enough to separate but yet large enough to be maintained in a relatively dense ebullated bed.

While I have shown and described a preferred process for carrying out my invention, I am aware that modifications may be made thereto within the scope and spirit of the description herein and of the claims appended hereinafter.

I claim:
1. In a chemical reaction involving a three component system of a liquid hydrocarbon oil, a gasiform material and a mass of particulate solids consisting of at least two bodies of particles which particles are between 1/2" diameter and 60 mesh (Tyler) wherein each of these bodies of particles has a distinct function, wherein the liquid and gasiform material, under temperature and pressure conditions required for the specified reaction, pass upwardly through the mass of particulate solids in a reaction zone of substantially uniform cross section with a liquid linear velocity in the range of 5 to 500 gallons per minute per square foot of horizontal cross section of the reaction zone so as to expand one of the bodies of particles at least 10% above the settled state of body but below a rate to carry any substantial amount of any of the particulate solids out of the reaction zone, the linear gas rate for the size and density of the particles being sufficient to aid in producing a random motion of each group of the particles in the liquid, but, by itself, insufficient to accomplish fluidization of the particles, the improvement in promoting stratification of the bodies of particles which comprises using bodies of particulate solids of different fluidization characteristics having independent voidage under the same liquid and gas flow conditions of between 0.35 and 0.75 and having a minimum difference of fluidized voidage of 0.05 and a maximum difference of fluidized voidage such that the more easily fluidized bodies are not carried out of the reaction zone under normal operating conditions, and maintaining the gas rate, at a given liquid rate insufficient to cause such excessive backmixing as tends to destroy stratification of the two beds of particles.

2. In a chemical reaction as claimed in claim 1 maintaining the combined gas and liquid flow rates corresponding substantially to the formula $Y=AX^n-B$ wherein X and Y are respectively the liquid and gas rates expressed in feet per second and A, n and B are functions of particle size, particle density, liquid density and viscosity.

3. In a chemical reaction as claimed in claim 2 wherein the bodies of particles of less easily fluidized bodies are cylinders of about 3/16" in length and 1/16" in diameter and the particles of more easily fluidized particles are about 1/32" diameter and wherein X and Y are expressed in feet per second, A is 8.3, n is 2.5 and B is 0.025.

4. In a chemical reaction as claimed in claim 1 wherein the liquid component is a hydrocarbon containing material, the gaseous component is a hydrogen containing gas, the body of particles of the more easily fluidized type are sulfactive catalyst, and the body of the more difficultly fluidized particles are solids from the group of alumina or, silica.

5. The process of hydrogenating a petroleum oil composed of at least 10% by volume of a fraction boiling above 900° F. and having a sulfur content of at least 1 wt. percent and at least 25 p.p.m. of metals as metallo-organic compounds which comprises flowing said oil in liquid phase with a hydrogen-rich gas upwardly through a contact zone containing stratified bodies of particulate solids at a hydrogen pressure and at a temperature and space velocity such that the feed is desulfurized and the conversion of the fraction boiling above 900° F. to a fraction boiling below 900° F. is greater than 25%, maintaining a hydrogen-rich gas velocity in the order of 6000 standard cubic feet of hydrogen per barrel of hydrocarbon charge, collecting a reaction effluent containing a substantial amount of liquid and recycling a portion of said liquid to the lower part of the contact zone such that the upflow liquid velocity including the feed shall be maintained in the order of 10 to 60 gallons per minute per square foot of horizontal cross section of the zone, and maintaining in such reaction zone a body of more easily fluidized sulf-active catalyst and a more difficultly fluidized catalyst from the group of alumina and silica, the difference in voidage between the two bodies being not less than 0.05 and within the range between 0.35 and 0.75 and maintaining the liquid rate such that the body of more easily fluidized particles is expanded at least 10% over a settled bed of particles and maintaining the gas rate for any given liquid rate below that causing excessive backmixing which tends to destroy stratification of the two beds of particles.

References Cited by the Examiner
UNITED STATES PATENTS

| | | | |
|---|---|---|---|
| 2,443,673 | 6/48 | Atwell | 208—149 |
| 2,503,291 | 4/50 | Odell | 208—149 |
| 2,987,465 | 6/61 | Johanson | 208—112 |
| 2,987,467 | 6/61 | Keith et al. | 208—97 |

ALPHONSO D. SULLIVAN, *Primary Examiner.*
MILTON STERMAN, *Examiner.*